United States Patent
Muramatti et al.

(10) Patent No.: US 10,713,079 B2
(45) Date of Patent: Jul. 14, 2020

(54) SYSTEM AND METHOD FOR MANAGING TELEMETRY DATA AND AGENTS IN A TELEMETRY SYSTEM

(71) Applicant: NUTANIX, Inc., San Jose, CA (US)

(72) Inventors: Akshay Muramatti, San Jose, CA (US); Mohan Maturi, San Jose, CA (US); Tung-Keng Lee, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 98 days.

(21) Appl. No.: 16/017,046

(22) Filed: Jun. 25, 2018

(65) Prior Publication Data

US 2019/0391833 A1 Dec. 26, 2019

(51) Int. Cl.
*G06F 9/455* (2018.01)
*G06F 9/50* (2006.01)
*H04L 29/08* (2006.01)

(52) U.S. Cl.
CPC ........ *G06F 9/45558* (2013.01); *G06F 9/5077* (2013.01); *H04L 67/10* (2013.01); *G06F 2009/4557* (2013.01); *G06F 2009/45575* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 8,549,518 | B1 | 10/2013 | Aron et al. | |
| 8,601,473 | B1 | 12/2013 | Aron et al. | |
| 8,850,130 | B1 | 9/2014 | Aron et al. | |
| 9,772,866 | B1 | 9/2017 | Aron et al. | |
| 2013/0036311 | A1* | 2/2013 | Akyol | H04L 63/08 713/189 |
| 2017/0102979 | A1* | 4/2017 | Ramirez | G06F 11/079 |
| 2018/0048619 | A1* | 2/2018 | Maluf | H04L 61/106 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Diem K Cao
(74) *Attorney, Agent, or Firm* — Foley & Lardner LLP

(57) ABSTRACT

A system and method include determining, by a telemetry control system of a telemetry system that an agent associated with the telemetry control system terminated during operation. The agent collects telemetry data from data sources associated with the telemetry system. The system and method also include determining that a number of times the agent has terminated is greater than a predetermined threshold, restarting the agent after a first predetermined delay in response to exceeding the predetermined threshold, and determining that the agent terminated again within a predetermined time period upon restarting. The system and method further include updating a configuration file of the agent in response to the termination within the predetermined time period and restarting the agent with the updated configuration file. The updating is based upon an agent termination record of the agent.

24 Claims, 8 Drawing Sheets

(56) References Cited

U.S. PATENT DOCUMENTS

2019/0104083 A1* 4/2019 Bernat .............. H04L 41/5009
2019/0230176 A1* 7/2019 Dornemann .......... H04L 41/042

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/ Examiner.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Hickey, Nigel "Understanding vSphere Health" VMware vSphere Blog (Jan. 28, 2019) from https://blogs.vmware.com/vsphere/2019/01/understanding-vsphere-health.html (retrieved Apr. 20, 2020).
Microsoft Docs, "Deploy Office Telemetry Dashboard" (Feb. 4, 2020) from https://docs.microsoft.com/en-us/deployoffice/compat/deploy-telemetry-dashboard (retrieved Apr. 20, 2020).
NetApp Active IQ Team, "Security and Privacy of NetApp Telemetry Data" (May 2018) from https://www.netapp.com/us/media/tr-4688.pdf (retrieved Apr. 20, 2020).
NetApp Active IQ Team, "Telemetry and UI Feature Security" (May 2018) from https://www.netapp.com/us/media/tr-4699.pdf (retrieved Apr. 20, 2020).
Nimble Storage "Nimble Storage Infosight: Defining a New Storage Experience" Datasheet: Infosight (2015) from https://www.adn.de/fileadmin/user_upload/Hersteller/Nimble/Datenblaetter/nimblestorage-ds-infosight.pdf (retrieved Apr. 20, 2020).

* cited by examiner

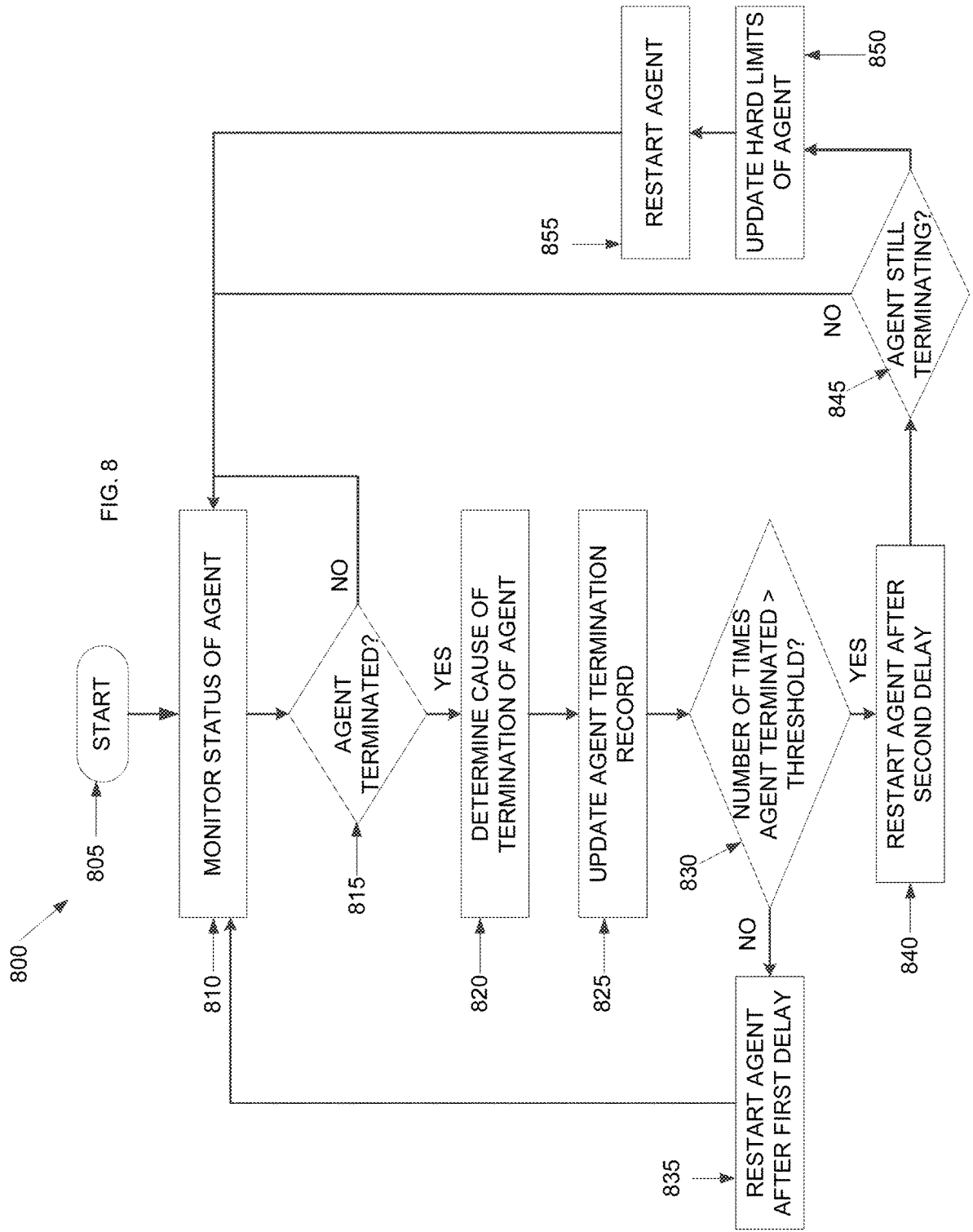

SYSTEM AND METHOD FOR MANAGING TELEMETRY DATA AND AGENTS IN A TELEMETRY SYSTEM

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with some aspects of the present disclosure, a method is disclosed. The method includes determining, by a telemetry control system of a telemetry system that an agent associated with the telemetry control system terminated during operation. The agent collects telemetry data from data sources associated with the telemetry system. The method also includes determining, by the telemetry control system, that a number of times the agent has terminated is greater than a predetermined threshold, restarting, by the telemetry control system, the agent after a first predetermined delay in response to exceeding the predetermined threshold, and determining, by the telemetry control system, that the agent terminated again within a predetermined time period upon restarting. The method further includes updating, by the telemetry control system, a configuration file of the agent in response to the termination within the predetermined time period. The updating is based upon an agent termination record of the agent. The method also includes restarting, by the telemetry control system, the agent with the updated configuration file.

In accordance with some other aspects of the present disclosure, a system is disclosed. The system includes a telemetry system associated with a virtual computing system, the telemetry system including an agent to collect telemetry data from data sources of the virtual computing system and a telemetry control system to manage the agent. The telemetry control system includes a database configured to store the collected telemetry data and a processing unit configured to determine that the agent terminated during operation, determine that a number of times the agent has terminated is greater than a predetermined threshold, and restart the agent after a first predetermined delay in response to exceeding the predetermined threshold. The processing unit is also configured to determine that the agent terminated again within a predetermined time period upon restarting, update a configuration file of the agent in response to the termination within the predetermined time period, and restart the agent with the updated configuration file. The updating is based upon an agent termination record of the agent.

In accordance with yet other aspects of the present disclosure, a non-transitory computer readable media with computer-executable instructions embodied thereon is disclosed. The instructions when executed by a processor of a telemetry control system associated with a virtual computing system cause the telemetry control system to perform a process. The process includes determining that an agent associated with the telemetry control system terminated during operation. The agent collects telemetry data from data sources associated with the telemetry system. The process also includes determining that a number of times the agent has terminated is greater than a predetermined threshold, restarting the agent after a first predetermined delay in response to exceeding the predetermined threshold, and determining that the agent terminated again within a predetermined time period upon restarting. The process also includes updating a configuration file of the agent in response to the termination within the predetermined time period, and restarting the agent with the updated configuration file. The updating is based upon a past agent termination record of the agent.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 8 is an example flowchart outlining operations for monitoring the agent of FIG. 6 by the agent monitoring system of FIG. 7, in accordance with some embodiments of the present disclosure.

Figure 1:
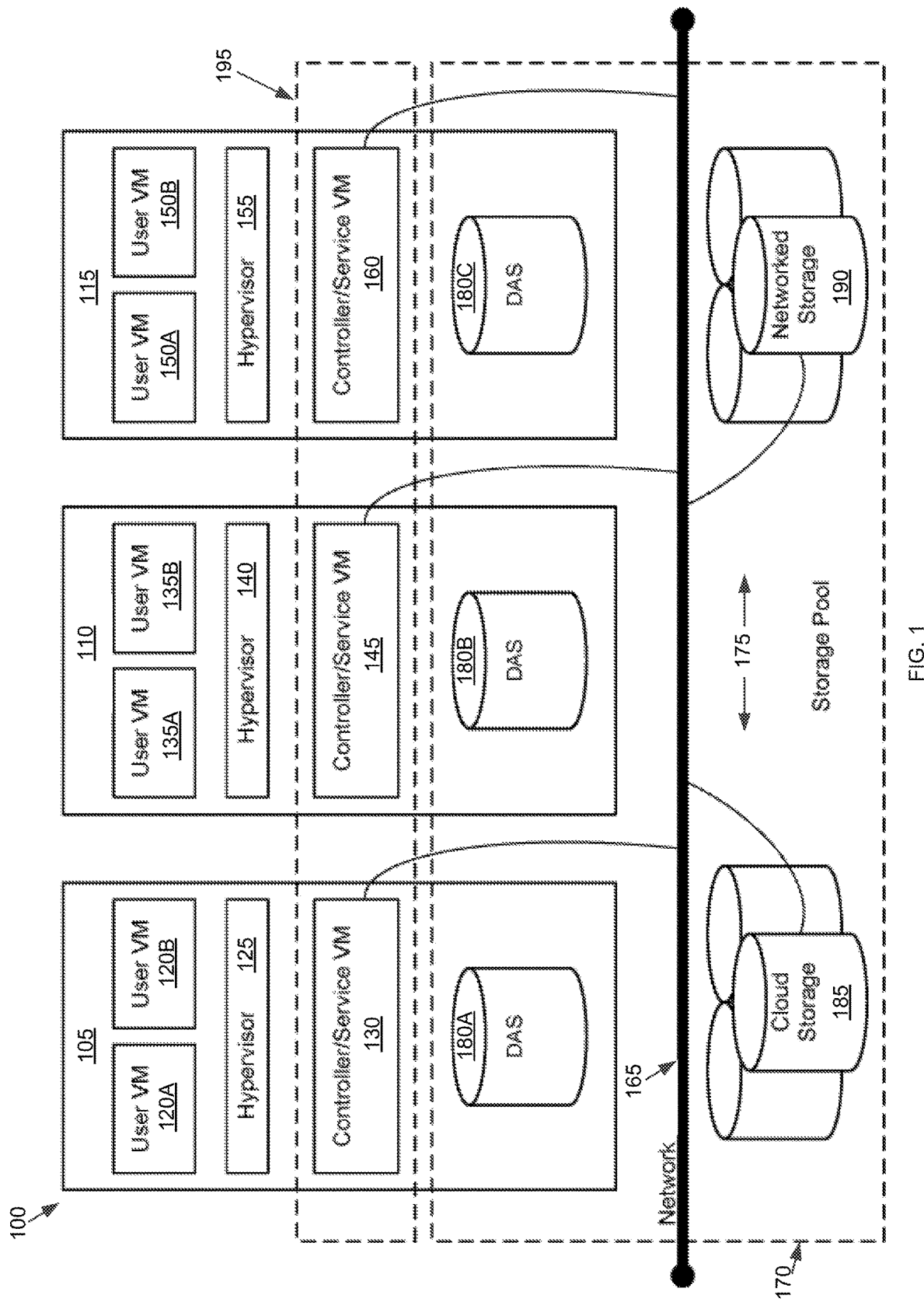
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. These and other various components within the virtual computing system may be part of a datacenter and may be managed by a user (e.g., an administrator or other authorized personnel). The virtual computing system also includes a telemetry system for collecting and managing telemetry data. The telemetry system includes one or more agents configured to collect telemetry data from one or more data sources (e.g., components) of the virtual computing system. The telemetry system also includes a telemetry control system that is configured to receive the collected telemetry data, transmit the collected telemetry data to one or more destinations, as well as manage the one or more agents to facilitate the collection and transmission of telemetry data in a reliable and efficient manner.

The rate at which telemetry data is collected by the one or more agents and the rate at which the collected telemetry data is transmitted by the telemetry control system to the one or more destinations is limited by a variety of factors. For example, the one or more agents may have a limited internal buffer to temporarily store the collected telemetry data before transmission to the one or more destinations. However, if the rate at which the telemetry data becomes available from the data sources is greater than the rate at which the collected telemetry data is transmitted from the telemetry control system to the one or more destinations, the internal buffer of the one or more agents may be insufficient to hold all of the available telemetry data. In such cases, telemetry data is either not collected from the data source, or is simply lost (e.g., overwritten by other telemetry data). While increasing the size of the internal buffer of the one or more agents may be a viable solution in some cases, such increases in size may be limited by other factors, such as the total amount of memory available, memory needed by other elements in the telemetry system, etc. Further, increasing the size of the internal buffer may increase the cost of deploying, using, and maintaining the agents, and consume resources that may otherwise be needed by other components or for other functions. Additionally, the internal buffer still remains susceptible to malfunctions and breakdown.

Likewise, in some cases, the telemetry data may be lost during transmission between the telemetry control system and the one or more destinations. For example, the one or more destinations may become unavailable and incapable of receiving telemetry data from the telemetry control system. The network interface between the telemetry control system and the one or more destinations may also become unavailable, thereby preventing transmission of the telemetry data to the one or more destinations. Thus, any telemetry data en route to the one or more destinations may be lost.

Thus, using conventional mechanisms, collected telemetry data is not reliably transmitted to the one or more destinations. Loss of telemetry data may be unacceptable for some applications, such as metering, that require highly reliable and accurate telemetry data from the data sources. Therefore, unreliable transmission of telemetry data not only reduces the efficiency of the telemetry system and prevents the telemetry system from operating optimally, the efficiency and operation of the one or more destinations that rely on the telemetry data is impeded.

Furthermore, the one or more agents that collect telemetry data from the data sources may themselves become unreliable and faulty. Resources available within the telemetry system may be rationed between the one or more agents. For example, each of the one or more agents may be allocated a set amount of memory, processing power, and other hardware and software resources to collect telemetry data. In some cases, an agent may use greater than its allocated share of resources, either because the agent has not been allocated sufficient resources or because of some malfunction within the agent. Thus, the agent may become a "mis-behaving agent." Such mis-behaving agents may impact the operation of the other agents. For example, the mis-behaving agent may encroach on the resources of the other agents and the problems of the mis-behaving agent may propagate to the other agents, thereby causing problems in the other agents as well.

Mis-behaving agents impact (e.g., reduce) the reliability of not only collection of the telemetry data, but the entire telemetry system. Again, the telemetry system is prevented from optimal operation due to mis-behaving agents.

The present disclosure provides technical solutions. For example, the present disclosure provides a telemetry data or state replication system in which telemetry data collected by the one or more agents is replicated by the telemetry control system before transmission to the one or more destinations. The telemetry data is replicated using a commit log. The telemetry control system stores the telemetry data received from the one or more agents within the commit log in a designated order. The telemetry control system also keeps track of the order in which the telemetry data from the commit log is transmitted to the one or more destinations. Telemetry data from the commit log is transmitted to the one or more destinations in small chunks to reduce the likelihood of the telemetry data being lost during transmission. Once the telemetry data is successfully transmitted to the one or more destinations, the transmitted chunk is deleted from the commit log to make room for more incoming telemetry data.

By virtue of replicating telemetry data in the commit log before transmission to the one or more destinations, the telemetry control system provides a mechanism for recovering telemetry data that may get lost during transmission to the one or more destinations. Further, since the telemetry data is not deleted from the commit log until successful transmission is confirmed and since the telemetry control system transmits the telemetry data in a specific order, if telemetry data is lost during transmission, the telemetry control system can easily determine which portion of data to resend. Thus, the telemetry control system can keep track of telemetry data being transmitted. Further, by virtue of replicating the telemetry data in the commit log, the telemetry control system is able to transmit the telemetry data to multiple destinations. If telemetry data is lost en route to one destination but not others, the telemetry control system may easily re-send the lost telemetry data to that one destination. Thus, the telemetry control system ensures a quality of service of delivery to each of the one or more destinations.

Additionally, the commit log is configured as a simple data structure that is easy to create and maintain. Further, since telemetry data that has been successfully transmitted is deleted from the commit log, the commit log may be of a limited size, but still effectively replicate the telemetry data.

Thus, the present disclosure provides a mechanism to reliably transmit telemetry data to the one or more destinations. If the rate of telemetry data collection is greater than telemetry data transmission, the excess telemetry data is prevented from being lost, and is successfully transmitted to the one or more destinations. Also by replicating telemetry data, failures or unavailability of the one or more destinations may be accounted for by temporarily storing telemetry data in the commit log until the one or more destinations become online and ready to accept telemetry data. Therefore, the reliability of collection and transmission of telemetry data is greatly improved, which in turn improves the reliability and operation of the telemetry system.

Additionally, the present disclosure provides a mechanism to proactively recognize mis-behaving agents and take corrective action. Specifically, the agents of the present disclosure are configured with a self-policing utility by which the agents monitor their own operation and performance, and upon identifying possible problems, those agents terminate themselves. Thus, the agents are configured to autonomously manage themselves, and prevent themselves from impacting other agents. By quickly, effectively, and reliably managing the mis-behaving agents by self-policing, the reliability and operation of the agents, collection of telemetry data by the agents, as well as the reliability and operation of the entire telemetry system is improved.

Furthermore, to prevent unnecessary obstruction from agents that are continuously terminating themselves, the telemetry control system is also configured to monitor the agents. When an agent self-terminates, the telemetry control system may determine the cause of termination, address the cause and possibly update the agents to prevent terminations from that cause in the future. Thus, the telemetry control system further improves the reliability and operation of the agents, the telemetry system, and collection of telemetry data.

Telemetry data, as used herein, means data such as facts, statistics, measurements, metrics, and the like, that provide insights into the operation and usage of a particular component. For example, telemetry data may provide performance related insights, insights into features that are most frequently used by end users, facilitate detection of bugs and errors in a particular component, and otherwise provide information about components without specifically soliciting inputs from the end users. In some embodiments, telemetry data of a component may include information such as what processes are running, which features are enabled and/or disabled, memory and processing unit utilizations, configuration information, other metrics and alerts being generated by the component, and any other information that may be needed to analyze the operation and usage of that component. The components from which telemetry data is collected are referred to herein as "data sources." These data sources may include hardware components, databases, file systems, and other software and firmware components associated with the telemetry system.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within the virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
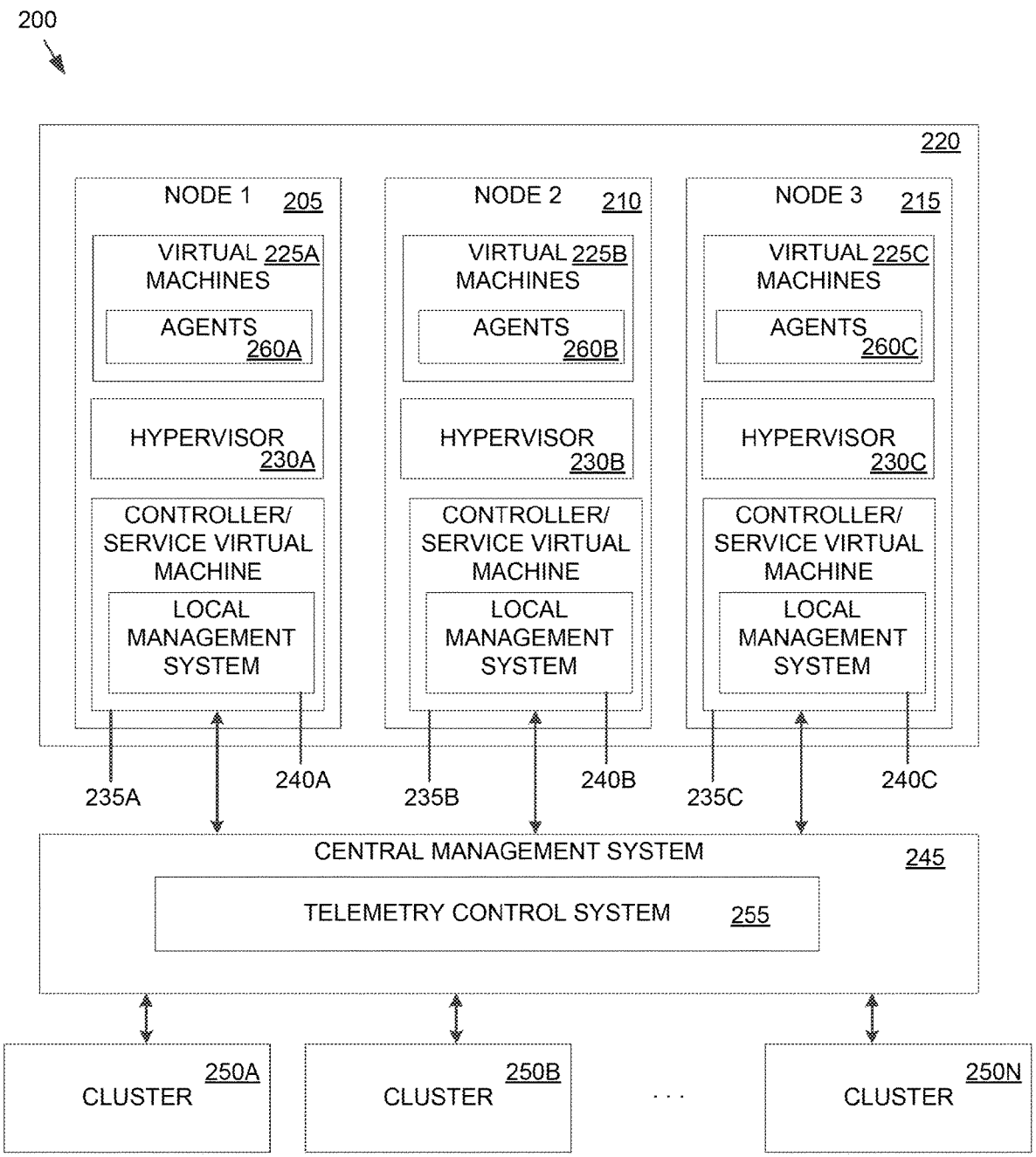
FIG. 2 is another example block diagram of the virtual computing system of FIG. 1, in accordance with some embodiments of the present disclosure.

Turning to FIG. 2, another block diagram of a virtual computing system 200 is shown, in accordance with some embodiments of the present disclosure. The virtual computing system 200 is analogous to, albeit a simplified version, of the virtual computing system 100. Thus, although only some of the components have been shown in the virtual computing system 200, the virtual computing system 200 is intended to include other components and features, as discussed above with respect to the virtual computing system 100. As shown, the virtual computing system 200 includes a first node 205, a second node 210, and a third node 215, all of which form part of a cluster 220. Although only three nodes (e.g., the first node 205, the second node 210, and the third node 215) have been shown in the cluster 220, the number of nodes may vary to be greater than or fewer than three.

The first node 205 includes virtual machines 225A, the second node 210 includes virtual machines 225B, and the third node 215 includes virtual machines 225C. The virtual machines 225A, 225B, and 225C are collectively referred to herein as "virtual machines 225." Additionally, the first node 205 includes a hypervisor 230A and a controller/service virtual machine 235A. Similarly, the second node 210 includes a hypervisor 230B, and a controller/service virtual machine 235B, while the third node 215 includes a hypervisor 230C, and a controller/service virtual machine 235C. The hypervisor 230A, 230B, and 230C are collectively referred to herein as "hypervisor 230." Similarly, the controller/service virtual machine 235A, 235B, and 235C are collectively referred to herein as "controller/service virtual machine 235."

Further, each of the controller/service virtual machine 235A, controller/service virtual machine 235B, and controller/service virtual machine 235C respectively include a local management system 240A, a local management system 240B, and a local management system 240C. The local management system 240A, the local management system 240B, and the local management system 240C (collectively referred to herein as "local management system 240"), in some embodiments, is the Prism Element component from Nutanix, Inc., and may be configured to perform a variety of management tasks on the underlying node (e.g., the first node 205, the second node 210, and the third node 215, respectively).

The virtual computing system 200 also includes a central management system (also referred to herein as "overall management system") 245. The central management system 245, in some embodiments, is the Prism Central component from Nutanix, Inc. that is configured to manage all of the clusters (e.g., including the cluster 220 and clusters 250A-250N) within the virtual computing system 200. In some embodiments, to manage a particular cluster (e.g., the cluster 220), the central management system 245 may communicate with one or more of the local management system 240 of that cluster. In other embodiments, the central management system 245 may communicate with the local management system 240 on the leader node or a local management system designated to communicate with the central management system, which in turn may then communicate with other components within the cluster (e.g., the cluster 220) to perform operations requested by the central management system. Similarly, the central management system 260 may communicate with the local management systems of the nodes of the clusters 250A-250N in the virtual computing system 200 for managing those clusters.

The central management system 245 also includes a telemetry control system 255. The telemetry control system 255 is configured to manage telemetry data collected from one or more data sources. The telemetry control system 255 facilitates collection of the telemetry data from the data sources via agents 260A, 260B, and 260C (collectively referred to herein as "agents 260"). As used herein, a "data source" means a component of the virtual computing system 200 from which telemetry data is collected. For example, in some embodiments, data sources within the virtual computing system 200 may include the virtual machines 225, the controller/service virtual machines 235, the hypervisor 230, one or more virtual disks or other storage components, networking components, or any other components such as software applications, file systems, databases, and other hardware, software, storage, virtual clouds, and data center components that make up a virtual computing system 200. Further, in some embodiments, the agents 260 may be located on the data source from which telemetry data is to be collected. In other embodiments, the agents 260 may be located remote from the data sources from which the telemetry data is to be collected.

Thus, although the agents 260 have been shown as being on the virtual machines, in other embodiments, the agents may additionally or alternatively be on other components of the virtual computing system 200. When running on the virtual machines 225, in some embodiments, the agents 260 may be within a software application installed on the underlying virtual machine to collect telemetry data from that particular application. In other embodiments, the agents 260 may additionally or alternatively be run on other components of the virtual machines 225. Further, each of the agents 260 is communicably connected to the telemetry control system 255, which is also configured to manage the transmission of the collected telemetry data to designated end points, as well as manage the creation and operation of the agents 260. The agents 260 and the telemetry control system 255 together form a telemetry system.

Although the telemetry control system 255 has been shown as being part of the central management system 245, in some embodiments, the telemetry control system may be part of one or more of the local management system 240. In yet other embodiments, an instance of the telemetry control system 255 may be on the central management system 245 and another instance of the telemetry control system may be on one or more of the local management system 240. In some embodiments, certain features of the telemetry control system 255 may be made available on the central management system 245 and other features may be made available on one or more of the local management system 240. Thus, the telemetry control system 255 may be configured in a variety of ways.

Figure 3:
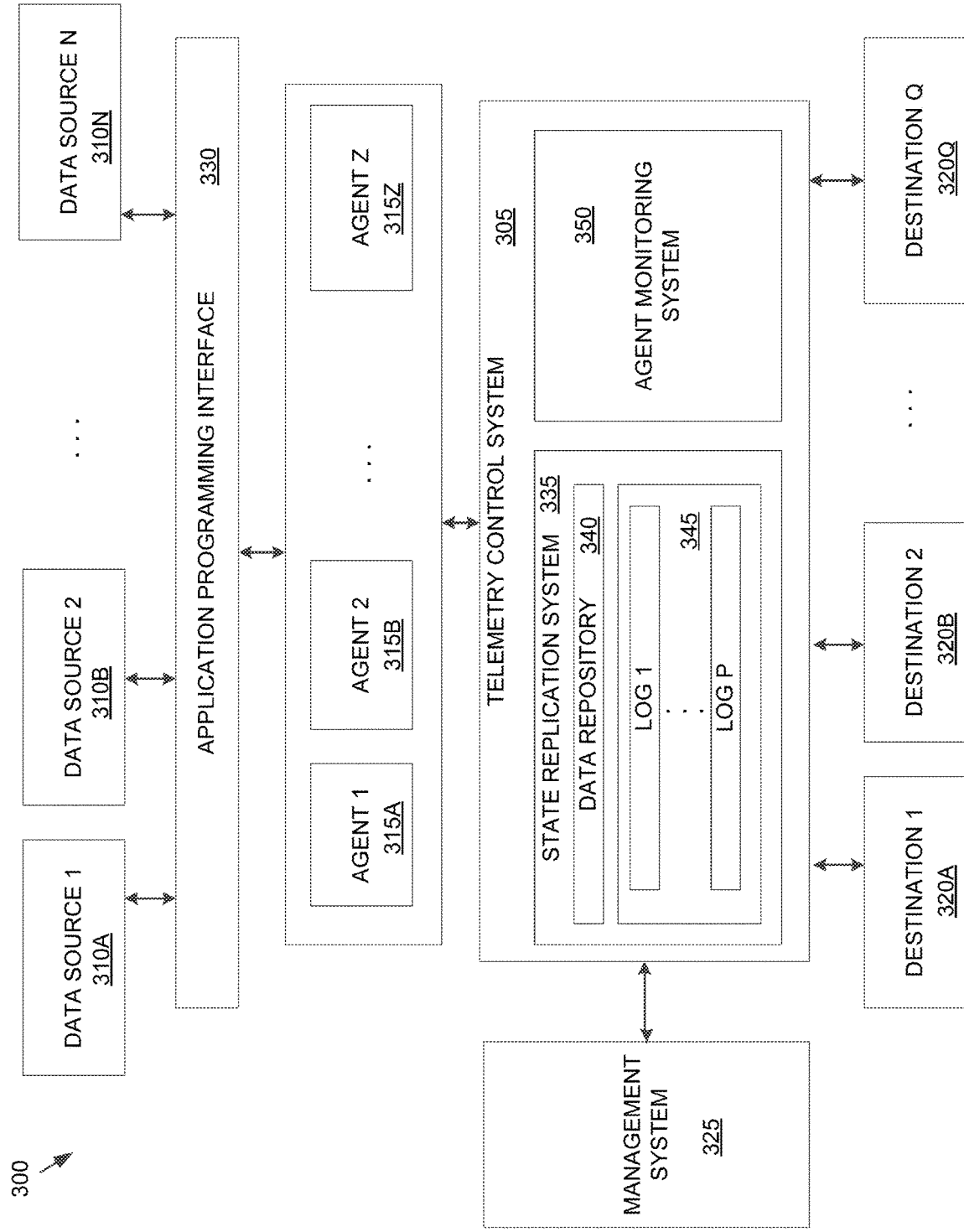
FIG. 3 is an example block diagram of a telemetry system of the virtual computing system of FIGS. 1 and 2, in accordance with some embodiments of the present disclosure.

Referring now to FIG. 3, an example block diagram of a telemetry system 300 is shown, in accordance with some embodiments of the present disclosure. The telemetry system 300 is configured to facilitate collection of telemetry data from one or more data sources, manage transmission of the collected telemetry data to one or more designated end points, as well as manage the various agents that collect the telemetry data from the data sources. The telemetry system 300 includes a telemetry control system 305 (also referred to herein as a "collector framework service") that is configured to facilitate collection of telemetry data from data sources 310A-310N via agents 315A-315Z. The data sources 310A-310N are collectively referred to herein as "data sources 310," while the agents 315A-315Z are collectively referred to herein as "agents 315." The telemetry control system 305 is also configured to transmit the collected telemetry data to one or more destinations 320A-320Q, also referred to herein as "end-points," or the like. The one or more destinations 320A-320Q are collectively referred to herein as "destinations 320." The telemetry control system 305 may in turn be managed/controlled by a management system 325.

In some embodiments, the agents 315 may be configured to automatically collect telemetry data periodically from the data sources 310. In other embodiments, the agents 315 may, additionally or alternatively, receive instructions from the telemetry control system 305 to collect telemetry data and upon receiving those instructions, the agents may collect the telemetry data from the data sources 310. As used herein, each of the agents 315 is a software program that is configured to operate autonomously (e.g., without specific user input or interaction) to gather a specific type of information from the data sources 310. Thus, each of the agents 315 is configured to achieve a particular goal (e.g., collect a specific type of telemetry data) and may be configured to activate itself to achieve that goal based on constraints programmed therein. A configuration file (e.g., configuration file 510 in FIG. 5 below) within each of the agents 315 outlines the various constraints and other operating parameters within which the agents operate. In some embodiments, the agents 315 may work together to facilitate collection of the telemetry data. Further, as will be explained further below, the agents 315 are intelligent agents that are capable of monitoring themselves and modifying the manner in which they operate. Additionally, since the agents 315 are configured to collect telemetry data, the agents may also be referred to as collectors, collecting agents, or the like.

Thus, in some embodiments, each of the agents 315 may be configured to collect a specific type of telemetry data. For example, one or more of the agents 315 may be configured to collect configuration related telemetry data, other ones of those agents may be configured to collect metric related telemetry data, and yet other ones of those agents may be configured to collect alert related telemetry data, and so on. Further, in some embodiments, each of the agents 315 may be configured to collect telemetry data from a particular one or more of the data sources 310. For example, in some embodiments, the agent 315A may be configured to collect configuration related telemetry data from one or more of the data sources 310, the agent 315B may be configured to collect metric related telemetry data from one or more of the data sources 310, and so on. Thus, each of the data sources 310 may allow multiple ones of the agents 315 to collect telemetry data therefrom, with each agent collecting a particular type of telemetry data.

In other embodiments, one or more of the agents 315 may be configured to collect all types of telemetry data, but from a designated one or more of the data sources 310. For example, in some embodiments, the agent 315A may be configured to collect all types of telemetry data from the data source 310A, the agent 315B may be configured to collect all types of telemetry data from the data source 310B, and so on. Thus, the type of telemetry data that a particular agent (e.g., the agents 315) collects and the data source from which that particular agent collects telemetry data may vary based upon the configuration of that particular agent.

Further, as indicated above, an agent (e.g., the agents 315) may be located on the data source (e.g., the data sources 310 or within a component of the data source) or be remote therefrom. Thus, although the agents 315 have been shown as located remotely from the data sources 310, in some embodiments, one or more of those agents may be located (e.g., installed) on the data source from which the telemetry data is to be collected.

Additionally and particularly in those embodiments in which the agents 315 automatically collect telemetry data from the data sources 310, those agents may be programmed with a time period to periodically collect telemetry data. For example, in some embodiments, the agents 315 may be configured to collect telemetry data every pre-determined number of seconds, minutes, hours, days, months, or in any other unit of time. Further, each of the agents 315 may be programmed with a different time period to collect telemetry data. In some embodiments, one or more of the agents 315 may be configured to collect telemetry data continuously. In such embodiments, the agents 315 may continuously monitor the appropriate ones of the data sources 310, and collect telemetry data as soon as the telemetry data becomes available. Thus, the time frame within which the agents 315 collect telemetry data from the data sources 310 may vary from one embodiment to another.

The type of telemetry data, the identity (e.g., name, location, etc.) of the data source (e.g., the data sources 310) from which telemetry data is collected, and the frequency with which the telemetry data is collected may be programmed within the configuration file of each of the agents 315. Therefore, the configuration of each of the agents 315 may vary from one embodiment to another as desired.

To collect telemetry data from the data sources 310, each of the agents 315 communicates with an Application Programming Interface ("API") 330. The API 330 provides an interface with a set of routines, protocols, and tools to allow the agents 315 to access the appropriate ones of the data sources 310 and collect the appropriate type of telemetry data from those data sources. For example, in some embodiments, to collect telemetry data, an agent (e.g., the agents 315) may contact the API 330, which in turn may access the appropriate one or more of the data sources 310 from which the telemetry data is to be collected. In particular, the API 330 may access the databases, logs, counters, and other files of those data sources 310 where telemetry data may be found. The API 330 may extract the telemetry data and return the collected telemetry data to the agent. Thus, the API 330 facilitates collection of telemetry data. Although a single instance of the API 330 is shown in the telemetry system 300, in other embodiments, multiple instances of the API may be provided, with each API instance configured to access a particular one or more of the data sources 310 and/or collect a particular type of telemetry data. Further, although the API 330 is shown separate from the data sources 310 and the agents 315, in some embodiments, the API may be part of the data sources or the agents. Further, in some embodiments, the agents 315 may use mechanisms other than an API to collect telemetry data from the data sources 310.

The agents 315 may also be configured to transmit the collected telemetry data to the telemetry control system 305. In some embodiments, the agents 315 may be configured to temporarily buffer the collected telemetry data and transmit the collected telemetry data to the telemetry control system 305 periodically or when the buffer space is full. Upon successful transmission, the agent 315 may delete the transmitted telemetry data. In other embodiments, the agents 315 may be configured to transmit the collected telemetry data instantaneously or substantially instantaneously to the telemetry control system 305. Each chunk of telemetry data that is transmitted from the agents 315 to the telemetry control system 305 may be considered a "telemetry data stream."

The telemetry control system 305 receives the telemetry data from the agents 315 and stores the telemetry data within a state replication system 335, and particularly, within a data repository 340 of the state replication system. The state replication system 335 of the telemetry control system 305 is configured to aggregate the telemetry data received from the agents 315 and sort the telemetry data into one or more commit logs 345 before transmission to the destinations 320. Specifically, in some embodiments, the state replication system 335 may create an instance of a commit log (e.g., the commit logs 345) for each type of telemetry data received from the agents 315. Each such commit log may, thus, store a particular type of telemetry data from multiple data sources (e.g., the data sources 310). In other embodiments, the state replication system 335 may create an instance of a commit log (e.g., the commit logs 345) for each data source (e.g., the data sources 310). Each such commit log may, thus, store multiple types of telemetry data, but for a single data source. In yet other embodiments, the state replication system 335 may create an instance of a commit log (e.g., the commit logs 345) that stores a particular type of telemetry data from a particular data source (e.g., the data sources 310) only. In such cases, each data source may have multiple commit logs associated therewith, with each commit log storing a particular type of telemetry data from that data source. Thus, the number of the commit logs 345, the type of telemetry data that each of those commit logs store, as well as the data source from which the telemetry data is extracted may vary from one embodiment to another.

Additionally, the state replication system 335 may define the size of each of the commit logs 345 at the time those commit logs are created. Each of the commit logs 345 may be created with a different size based upon the type of telemetry data stored within each commit log and/or the data sources (e.g., the data sources 310) associated with each commit log. For example, a commit log (e.g., the commit logs 345) configured to store telemetry data that is collected more frequently may need a larger size commit log than a commit log configured to store telemetry data that is collected less frequently. Likewise, a commit log that is configured to store telemetry data that is more space intensive (e.g., bigger in size) may be larger in size than a commit log configured to store telemetry data that is less space intensive. Similarly, the size of a commit log configured to store telemetry data from multiple data sources (e.g., the data sources 310) may be larger than a commit log configured to store telemetry data from a single data source. Thus, the size of the commit logs 345 may vary from one embodiment to another.

Further, the timing of creation of the commit logs 345 may vary from one embodiment to another. For example, in some embodiments, the state replication system 335 may create the commit logs 345 upon encountering a specific type of telemetry data and/or telemetry data from a specific data source (e.g., the data sources) for the first time. Thus, the state replication system 335 may analyze the incoming telemetry data from the agents 315, and create an instance of a commit log (e.g., the commit logs 345) on the fly if a commit log does not already exist to store the incoming telemetry data (or telemetry data from a particular data source). In other embodiments, the state replication system 335 may create an instance of a commit log (e.g., the commit logs 345) for each type of telemetry data (and/or each type of data source from which telemetry data is collected) that the telemetry control system 305 is configured to manage beforehand (e.g., at the time of initiation of the telemetry control system). In other embodiments, a subset of the commit logs 345 may be created on the fly, while another subset of the commit logs may be created beforehand.

Further, the state replication system 335 may save the commit logs 345 locally on a memory (e.g., on the direct-attached storage 180A, 180B, and 180C of FIG. 1) associated with the telemetry system 300, and particularly, with the telemetry control system 305. In other embodiments, the state replication system 335 may save the commit logs 345 on a network memory (e.g., the network-attached storage 175 in FIG. 1). In some embodiments, the state replication system 335 may save an instance of the commit logs 345 locally, and make a back-up on the network memory. Thus, the location of the commit logs 345 may also vary from one embodiment to another.

In sum, the state replication system 335 creates each of the commit logs 345 to have a particular size, a particular configuration (e.g., type of telemetry data to store, the data source from which to store telemetry data, or a combination of both), and a particular location within the virtual computing system (e.g., the virtual computing system 200). Thus, the state replication system 335 receives telemetry data from each of the agents 315 and appends the telemetry data from each of the agents to one of the commit logs 345. In addition to storing the telemetry data in the commit logs 345, the state replication system 335 may store time stamp information (e.g., the time when the telemetry data is received at the state replication system, the time at which the telemetry data is collected from the data sources 310, etc.) with each of the telemetry data. By virtue of associating time stamp information with each piece of telemetry data, the state replication system 335 is able to determine the chronological order of the telemetry data. As will be discussed below, in some embodiments, the state replication system 335 may transmit the telemetry data from the commit logs 345 in the order in which the telemetry data is received/collected as determined from the time stamp information. The state replication system 335 may associate and store other information related to the telemetry data in the commit logs 345 as well.

Referring still to FIG. 3, the telemetry control system also includes an agent monitoring system 350. The agent monitoring system 350 is configured to deploy and run the agents 315, as discussed in further detail below with respect to FIG. 7. Although the telemetry control system 305 is shown herein as having only the state replication system 335 and the agent monitoring system 350, in other embodiments, the telemetry control system may include additional or other elements that are configured to perform the functions disclosed herein. Further, although the state replication system 335 and the agent monitoring system 350 are shown as separate components of the telemetry control system 305, in some embodiments, those components may be integrated and the integrated component may perform the functions of both components.

Additionally and although not shown, the telemetry control system 305 may be configured as hardware, software, firmware, or a combination thereof. Specifically, the telemetry control system 305 may include one or more processing units configured to execute instructions for implementing the state replication system 335, the agent monitoring system 350, and the other functionalities of the telemetry control system. The telemetry control system 305 may also include one or more memory units to store those instructions, the commit logs 345, as well as the telemetry data (and other information) in those commit logs. In some embodiments, the telemetry control system 305 may be connected to a storage pool (e.g., the storage pool 170) to receive, send, and process information, and to store and manage the telemetry data. The instructions may be carried out by a special purpose computer, logic circuits, or hardware circuits of the telemetry control system 305. The processing units may, thus, be implemented in hardware, firmware, software, or any combination thereof. The processing units execute an instruction, meaning that they perform the operations called for by that instruction. The processing units may retrieve a set of instructions from a memory (e.g., the storage pool 170 or any other memory in which such instructions may be stored). For example, in some embodiments, the processing units may retrieve the instructions from a permanent memory device like a read only memory (ROM) device and copy the instructions in an executable form to a temporary memory device that is generally some form of random access memory (RAM). The ROM and RAM may both be part of the storage pool (e.g., the storage pool 170), or in some embodiments, may be separately provisioned from the storage pool. Further, the processing units may include a single stand-alone processing unit, or a plurality of processing units that use the same or different processing technology. The instructions may be written using one or more programming language, scripting language, assembly language, etc.

Furthermore, the telemetry control system 305 may be managed and operated by the management system 325. Thus, the telemetry control system 305 may form the back-end of the telemetry system 300, while the management system 325 may form the front-end of the telemetry system. A user may, via the management system 325, instruct the telemetry control system 305 to perform one or more operations. Example operations may include instructions to deploy new agents, delete existing agents, modify the configuration of an existing agent, manage the destinations to which the telemetry data from the commit logs 345 is transmitted, create new commit logs, delete existing commit logs, modify the configuration and/or location of existing commit logs, etc. Upon receiving instructions from the management system 325, the telemetry control system 305 may perform actions consistent with those instructions. Thus, the telemetry control system 305 is not visible to the user, but is rather configured to operate under control of the management system 325, which is visible to and operated by the user.

In some embodiments, the management system 325 may be installed on a device associated with the central management system (e.g., the central management system 245) and/or the local management system (e.g., the local management system 240). In some embodiments, the management system 325 may be accessed physically from the device on which the telemetry system (and particularly the telemetry control system 305) is installed. In other embodiments, the telemetry control system 305 and the management system 325 may be installed on separate devices. Further, the management system 325 may be configured to access the telemetry control system 305 via an API (e.g., an API different from the API 330). In such cases, users may access the management system 325 via designated devices such as laptops, desktops, tablets, mobile devices, other handheld or portable devices, and/or other types of computing devices that are configured to access the API. These devices may be different from the device on which the telemetry control system 305 is installed.

In some embodiments and when the management system 325 is configured for use via an API, the users may access the telemetry control system 305 via a web browser and upon entering a uniform resource locator ("URL") for the API. Using the API, the users may then send instructions to the telemetry control system 305 and receive information back from the telemetry control system. In some embodiments, the API may be a representational state transfer ("REST") type of API. In other embodiments, the API may be any other type of web or other type of API (e.g., ASP.NET) built using any of a variety of technologies, such as Java, .Net, etc., that is capable of accessing the telemetry control system 305 and facilitating communication between the users and the telemetry control system.

In some embodiments, the API may be configured to facilitate communication between the users via the management system 325 and the telemetry control system 305 via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication between the management system 325 and the telemetry control system 305 using other or additional types of communication protocols.

In other embodiments, instead of or in addition to being installed on a particular device as discussed above, the management system 325 may be hosted on a cloud service and may be accessed via the cloud using an API or other mechanism. In some embodiments, the management system 325 may additionally or alternatively be configured as a mobile application that is suitable for installing on and access from a mobile computing device (e.g., a mobile phone). In other embodiments, the management system 325 may be configured for user access in other ways.

Thus, the management system 325 provides a user interface that facilitates human-computer interaction between the users and the telemetry control system 305. Thus, the management system 325 is configured to receive user inputs from the users via a graphical user interface ("GUI") of the management system and transmit those user inputs to the telemetry control system 305. The management system 325 is also configured to receive outputs from the telemetry control system 305 and present those outputs to the users via the GUI of the management system. The GUI may present a variety of graphical icons, visual indicators, menus, visual widgets, and other indicia to facilitate user interaction. In other embodiments, the management system 325 may be configured as other types of user interfaces, including for example, text-based user interfaces and other man-machine interfaces. Thus, the management system 325 may be configured in a variety of ways.

Further, the management system 325 may be configured to receive user inputs in a variety of ways. For example, the management system 325 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the management system. The management system 325 may also be configured to present outputs to the users in a variety of ways. For example, the management system 325 may be configured to present information to external systems such as users, memory, printers, speakers, etc.

Therefore, although not shown, the management system 325 may be associated with a variety of hardware, software, firmware components, or combinations thereof. Generally speaking, the management system 325 may be associated with any type of hardware, software, and/or firmware component that enables the telemetry control system 305 to perform the functions described herein and further enables a user to control and manage the telemetry control system.

Referring still to FIG. 3, the destinations 320 may be a variety of end points to which the telemetry data from the commit logs are transmitted. For example, in some embodiments, one or more of the destinations 320 may be server systems or computing devices outside of the virtual computing system (e.g., the virtual computing system 200) with which the telemetry system 300 is associated, components/systems within the virtual computing system, the management system 325, and any other end point that desires the telemetry data to analyze and monitor the usage, performance, or other operational features of the data sources 310.

Figure 4:
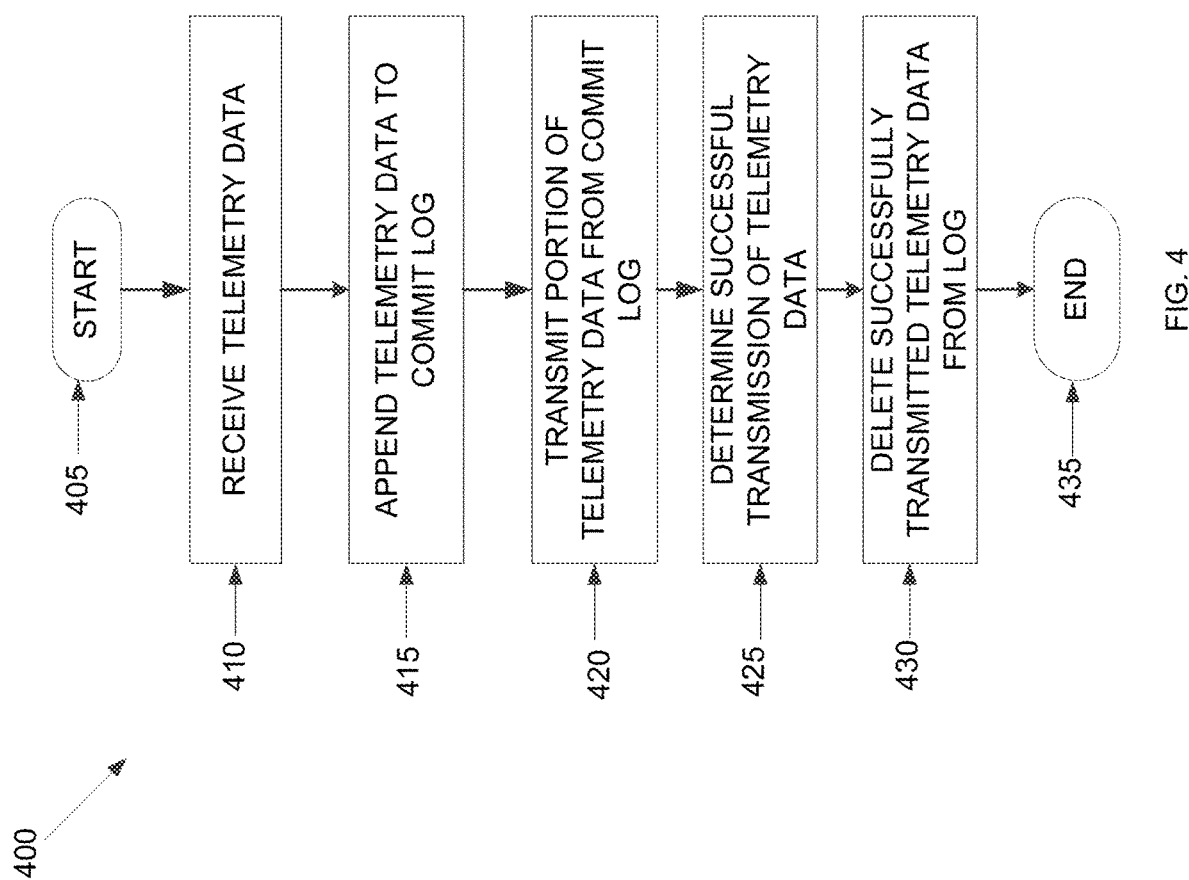
FIG. 4 is an example flowchart outlining operations for replicating telemetry data by the telemetry system, in accordance with some embodiments of the present disclosure.

Turning now to FIG. 4, an example flow chart outlining operations of a process 400 are shown, in accordance with some embodiments of the present disclosure. The process 400 may include additional, fewer, or different operations, depending on the particular embodiment. The process 400 is discussed in conjunction with FIG. 3 and is implemented by the telemetry control system 305, and particularly, by the state replication system 335 of the telemetry control system. The process 400 starts at operation 405 with the deployment of the agents 315 to collect telemetry data from the data sources 310. As indicated above, the agents 315 collect telemetry data via the API 330 from the data sources 310 continuously or periodically based upon a configuration of the agents. The agents 315 then transmit the collected telemetry data to the telemetry control system 305, which receives that telemetry data at operation 410. In some embodiments, the agents 315 may append additional information to the collected telemetry data before transmitting that telemetry data to the telemetry control system 305. For example, in some embodiments, the agents 315 may append a time stamp of the time when the telemetry data is collected. In some embodiments, the agents 315 may additionally or alternatively also append information pertaining to the type of telemetry data that is collected, the data sources 310 from which the telemetry data is collected, the size of the telemetry data, and any other information that is considered necessary or desirable.

Thus, the telemetry control system 305, and particularly, the state replication system 335 of the telemetry control system, receives the telemetry data from the agents 315 at the operation 410. The state replication system 335 analyzes and sorts the received telemetry data into one or more of the commit logs 345. Specifically and based upon the configuration of the commit logs 345, the state replication system 335 may determine at least the type of telemetry data that is received from the agents 315 and the data sources 310 from which the telemetry data has been collected. The state replication system 335 may then direct the telemetry data to the appropriate ones of the commit logs 345 for storing. Therefore, at operation 415, the state replication system 335 appends the telemetry data received at the operation 410 to one or more of the commit logs 345.

In some embodiments, the state replication system 335 may also store additional information in the commit logs along with the telemetry data, as discussed above. In some embodiments, the state replication system 335 need not store any additional information (e.g., time stamp information, size, etc.) along with the telemetry data. Rather, the state replication system 335 may simply assign a stream number or other parameter to each incoming telemetry data stream to keep track of the order in which a particular stream is added to a particular commit log. For example, if commit log 1 already includes streams 1 and 2, upon receiving a new telemetry data stream to be added to the commit log 1, the state replication system 335 may assign the new telemetry data stream a stream number 3 and add to the commit log 1. By way of assigning stream numbers (or other similar designations), the state replication system 335 may easily determine that telemetry data streams associated with stream numbers 1 and 2 were received prior to the telemetry data stream associated with the stream number 3. Thus, the state replication system 335 may use any of a variety of mechanisms to keep track of the relative order in which the telemetry data streams are received.

Further, so long as the state replication system 335 has a way to track the chronology of the telemetry data streams added to a particular commit log (e.g., the commit logs 345), the incoming telemetry data stream may be appended at the end of the commit log, at the beginning of the commit log, or somewhere in the middle. As part of storing the incoming telemetry data streams to the commit logs 345, the state replication system 335 may compress and/or encrypt the telemetry data.

At operation 420, the state replication system 335 transmits a portion of the telemetry data from one or more of the commit logs 345 to one or more of the destinations 320. In some embodiments, the timing of the transmission to one or more of the destinations 320 may vary. For example, in some embodiments, the state replication system 335 may be configured to monitor a size of telemetry data within each of the commit logs 345, and transmit a portion of the telemetry data from the commit logs once the size becomes greater than a predetermined limit. In other embodiments, the state replication system 335 may track the number of telemetry data streams in each of the commit logs 345. Once the number of the telemetry data streams becomes greater than a predetermined number, the state replication system 335 may transmit a portion of the telemetry data from that commit log. In yet other embodiments, the state replication system 335 may be configured to periodically transmit the telemetry data from the commit logs 345 to the one or more of the destinations 320. In some embodiments, the state replication system 335 may send telemetry data when a particular one of the destinations 320 demands that telemetry data or instantaneously as the telemetry data is received from the agents 315 (and upon storing into the commit logs 345). Thus, the timing of when the telemetry data from the commit logs 345 is transmitted to the one or more of the destinations 320 may vary from one embodiment to another.

Additionally, telemetry data from a particular one of the commit logs 345 may be transmitted to multiple ones of the destinations 320. Further, in some embodiments, the amount of the telemetry data that is transmitted in each transmission to the one or more of the destinations 320 may vary from one embodiment to another. For example, in some embodiments, a fixed size of the telemetry data may be transmitted in each transmission. In other embodiments, a predetermined number of telemetry data streams regardless of the size may be transmitted in each transmission. Further, the amount of telemetry data to be transmitted in each transmission may vary from one commit log to another.

Moreover, as noted above, the state replication system 335 keeps track of the chronology of the telemetry data streams in each commit log (e.g., the commit logs 345). In some embodiments, the state replication system 335 may be configured to transmit telemetry data in a First-In-First-Out ("FIFO") scheme. Thus, the oldest telemetry data in each commit log (e.g., the commit logs 345) is transmitted before more recent telemetry data. In other embodiments, other transmission schemes may be applied.

At operation 425, the state replication system 335 determines whether the portion of telemetry data being transmitted at the operation 420 was successfully transmitted. For example, the state replication system 335 may receive a notification from each of the destinations 320 to which the telemetry data is transmitted at the operation 420 that those destinations received the telemetry data. Upon determining that the transmission to each of the destinations 320 was successful, the state replication system 335, at operation 430, deletes the successfully transmitted telemetry data from the commit logs 345 to make room for new incoming telemetry data streams. The process 400 ends at operation 435.

Figure 5:
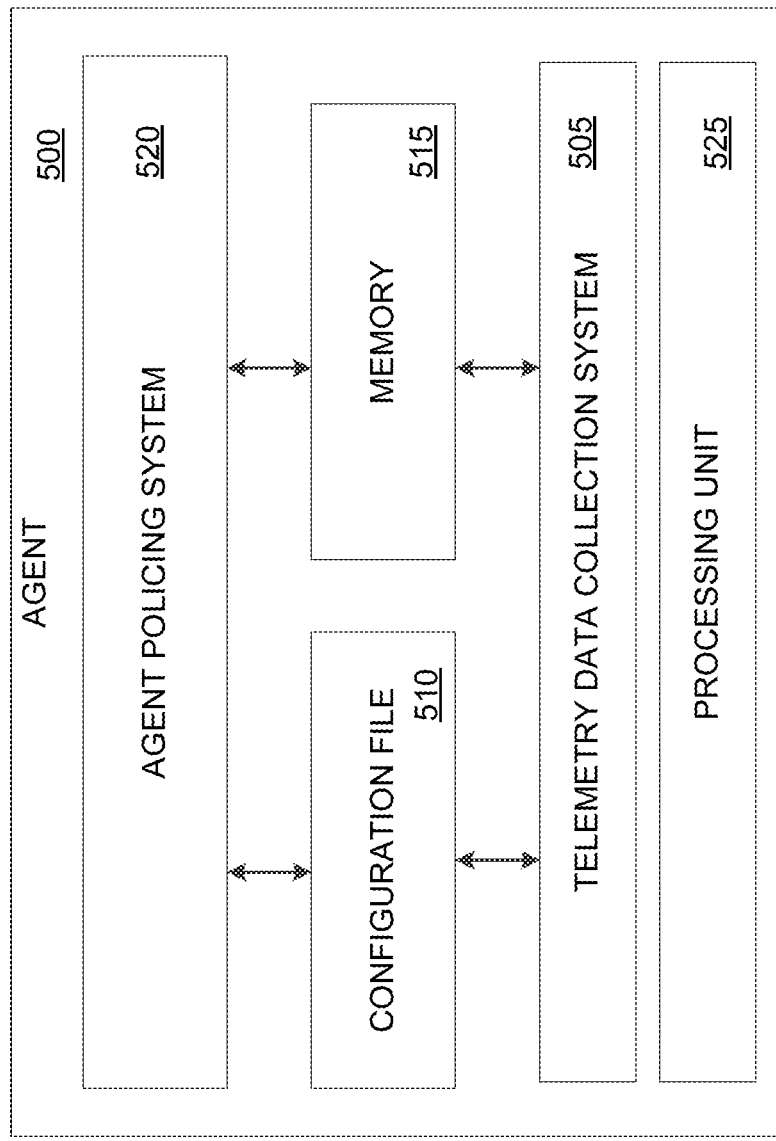
FIG. 5 is an example block diagram showing an agent of the telemetry system in greater detail, in accordance with some embodiments of the present disclosure.

Referring now to FIG. 5, a block diagram of an agent 500 is shown, in accordance with some embodiments of the present disclosure. The agent 500 is analogous to the agents 315 of FIG. 3. FIG. 5 is, thus, discussed in conjunction with FIG. 3. As indicated above, the agent 500 is an autonomous software program that is configured to collect telemetry data from the data sources 310 and transmit the collected telemetry data to the telemetry control system 305. To facilitate collection of telemetry data, the agent 500 includes a telemetry data collection system 505. The telemetry data collection system 505 collects telemetry data from the data sources 310 in accordance with the guidelines noted in the configuration file 510. Based on the guidelines, the telemetry data collection system 505 communicates with the API 330 to access the telemetry data in the data sources 310 and receive the collected telemetry data via the API. The telemetry data collection system 505 may at least temporarily store the collected telemetry data in a memory 515 before transmission of the collected telemetry data to the telemetry control system 305. In some embodiments, the telemetry data collection system 505 may also aggregate the collected telemetry data before transmission. For example, in some embodiments, the telemetry data collection system 505 may use an average, minimum, maximum, or other mathematical function to aggregate and combine the collected telemetry data. In some embodiments, the telemetry data collection system 505 may additionally or alternatively compress and/or encrypt the collected telemetry data or employ other data reducing or security measures. In other embodiments, the telemetry data collection system 505 may simply transmit the collected telemetry data and the telemetry control system 305 may perform the data aggregation and combining, as well as apply data reducing and security measures if needed or desired.

The agent 500 operates in accordance with the configuration provided in the configuration file 510. The configuration file 510 may be created upon the deployment of the agent 500. The telemetry control system 305 may control the operation of the agent 500 by modifying, among other things, the configuration file 510 of the agent. The configuration file 510 includes parameters such as the type of telemetry data to collect, identity and location of the data sources 310 to collect telemetry data from, frequency (e.g., time period) of collecting telemetry data, frequency of transmission of the collected telemetry data to the telemetry control system 305, additional information to append to the collected telemetry data before transmission, and information about what constructs, if any, to apply to the collected telemetry data before transmission (e.g., aggregation, compression, encryption, etc.). The configuration file 510 may also include the priority of the agent 500 with respect to the priority of other agents in the virtual computing system (e.g., the virtual computing system 200), and include other metadata/parameters to properly run the agent 500.

The configuration file 510 may further include one or more logs to record the usage and operating characteristics and statistics of the agent 500. The configuration file 510 may also include a log to record termination events of the agent 500, including termination causes. The configuration file 510 may additionally include resource limits, such as allocated processing unit size (e.g., amount of central processing unit power allocated), memory size (e.g., amount of allocated memory), and metrics on other resources allocated to the agent 500. The configuration file 510 may also include a soft limit and a hard limit for each resource allocated to the agent 500. The soft limit and the hard limit may be indicative of a potential problem with the agent 500, as discussed further below.

Thus, the configuration file 510 may include a variety of parameters and initial settings for properly operating the agent 500. It is to be understood that although certain parameters and initial settings of the configuration file 510 are discussed above, in other embodiments, additional or different parameters and settings may be included within the configuration file.

Further, as discussed above, proper operation of the agent 500 is desired to improve the reliability of the telemetry system 300, and that each agent in the telemetry system may impact the operation of other agents in the telemetry system. Thus, a problem encountered by one agent may propagate to the other agents, or at least impact the operation of those agents. To ensure the reliability of the telemetry system and optimal operation of the agents, each agent (e.g., the agent 500) within the telemetry system 300 includes an agent policing system 520. The agent policing system 520 is configured to enforce the various resource limits of the agent 500. Specifically, the agent policing system 520 ensures that the underlying agent (e.g., the agent 500) is using the resources allocated thereto, and if the resource utilization exceeds the allocated limits, then the agent enters a troubleshooting mode, explained below.

By keeping a check on the resource limits, the agent policing system 520 ensures that the agent 500 does not encroach on the resources to be used by the other agents in the telemetry system 300. Additionally, by keeping track of the resource limits, the agent policing system 520 may proactively identify potential problems within the agent 500 and take corrective action to remedy those problems proactively, thereby preventing those problems from escalating and propagating to the other agents. Thus, the agent 500 can self-police via the agent policing system 520 to maintain optimal operating conditions. The agent policing system 520 uses the soft limit and the hard limit of each resource allocated to the underlying agent (e.g., the agent 500) to monitor that agent, as explained in FIG. 6 below.

The agent 500 also includes a processing unit 525. The processing unit 525 may be configured to execute instructions for implementing the telemetry data collection system 505 and the agent policing system 520. The processing unit 525 may also include instructions to facilitate the access of the agent 500 by the telemetry control system (e.g., the telemetry control system 305 in FIG. 3) to manage the configuration file 510, as well as manage and control the other functionalities of the agent. The memory 515 may store those instructions, as well as the collected telemetry data, the configuration file 510, and any other information that needs to be stored by the agent 500. The memory 515 may be a local memory (e.g., the direct-attached storage 180A, 180B, and 180C of FIG. 1) or a network memory (e.g., the network-attached storage 175 in FIG. 1). Thus, the memory 515 may be part of the storage pool 170 of FIG. 1 or be separate therefrom.

The processing unit 525 may be connected to the memory 515 (and/or other memory devices) to receive, send, and process information for operating and managing the agent 500. The instructions may be carried out by a special purpose computer, logic circuits, or hardware circuits of the processing unit 525. The processing unit 525 may be implemented in hardware, firmware, software, or any combination thereof. The processing unit 525 executes an instruction, meaning that it performs the operations called for by that instruction. The processing unit 525 may retrieve a set of instructions from the memory 515 (or any other memory in which such instructions may be stored). For example, in some embodiments, the processing unit 525 may retrieve the instructions from a permanent memory device like a read only memory (ROM) device and copy the instructions in an executable form to a temporary memory device that is generally some form of random access memory (RAM). The ROM and RAM may both be part of the memory 515 or other designated memory. Further, the processing unit 525 may include a single stand-alone processing unit, or a plurality of processing units that use the same or different processing technology. The instructions may be written using one or more programming language, scripting language, assembly language, etc.

Although only certain components of the agent 500 have been shown and described in FIG. 5, it is to be understood that in other embodiments, additional or different components may be provided within or associated with the agent to perform the functions described herein.

Figure 6:
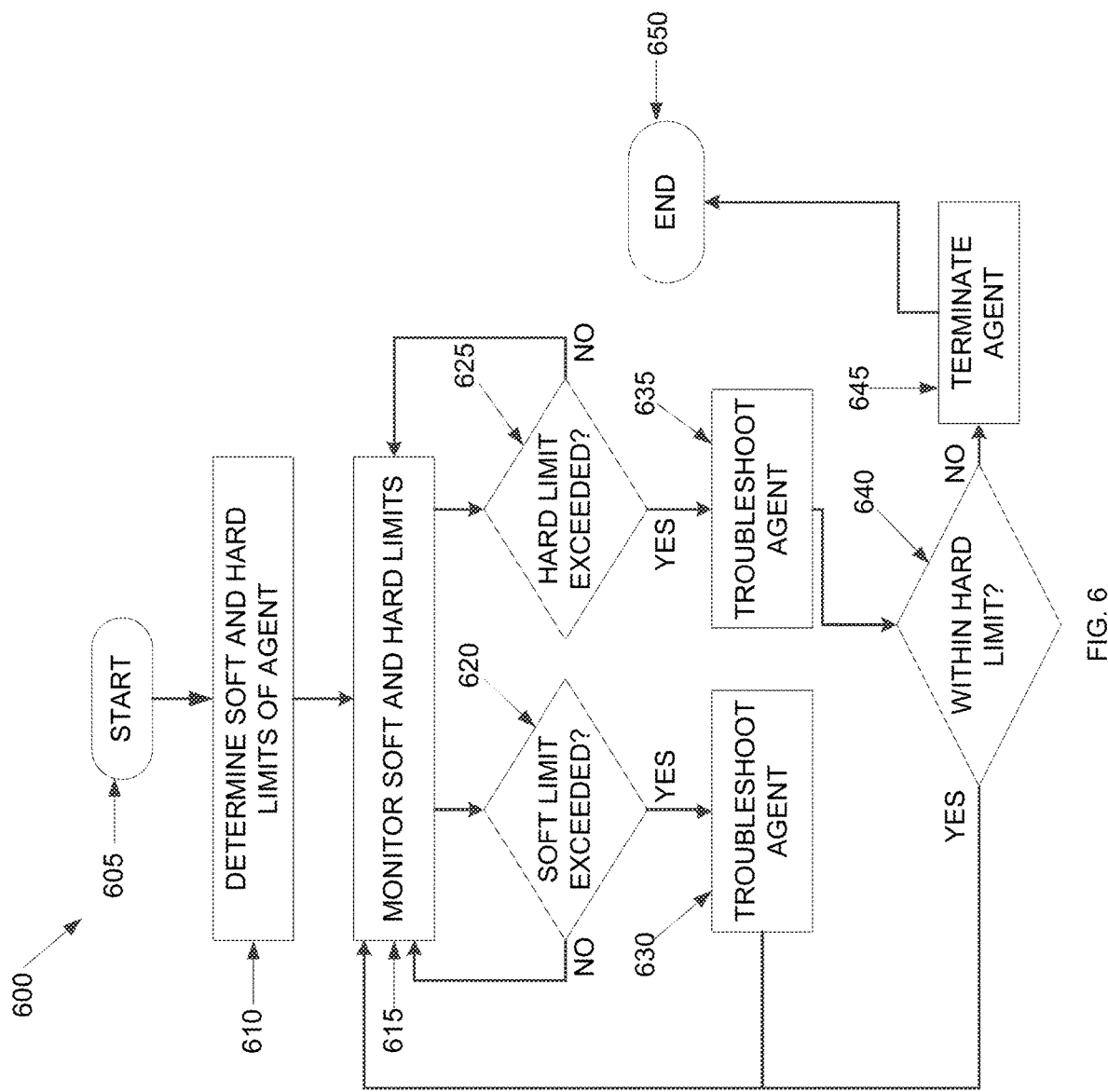
FIG. 6 is an example flowchart outlining operations for self-policing the agent, in accordance with some embodiments of the present disclosure.

Turning now to FIG. 6, an example flowchart outlining operations of a process 600 is shown, in accordance with some embodiments of the present disclosure. The process 600 may include additional, fewer, or different operations, depending on the particular embodiment. The process 600 is discussed in conjunction with FIGS. 3 and 5 and is implemented by the agent policing system 520 of the agent 500. The process 600 starts with the deployment of the agent 500. Upon deployment, the agent policing system 520 determines the soft limit and hard limit for each resource allocated to the agent 500 at operation 610. As indicated above, the configuration file 510 includes the soft limit and hard limit for each resource allocated to the agent 500. Thus, the agent policing system 520 obtains the soft limit and hard limit for the various resources from the configuration file 510.

In some embodiments, the agent policing system 520 may continuously monitor the configuration file 510 for any updates to the soft limits and hard limits by the telemetry control system 305. In other embodiments, the agent policing system 520 may periodically check the configuration file 510 for any updates to the soft and hard limits. Upon determining the soft and hard limits, the agent policing system 520 monitors the agent 500, and particularly, monitors for the breach of the soft limits and hard limits during operation of the agent at operation 615. Again, the agent policing system 520 may continuously or periodically monitor for breach of the soft and hard limits. The frequency with which to check the configuration file 510 for updates to the soft and hard limits, as well as the frequency with which to monitor the breach of the soft and hard limits may also be spelled out in the configuration file.

At operations 620 and 625, the agent policing system 520 determines whether any soft limits or hard limits have been breached. The soft limit exceeds the normal or typical resource utilization of a particular resource by a first predetermined threshold, and the hard limit exceeds the normal or typical resource utilization of the particular resource by a second predetermined threshold. The soft limit may be indicative of a "warning" condition, while the hard limit may be indicative of a "critical" condition. Each resource may have varying soft and hard limits, and the agent policing system 520 monitors the soft and hard limits of each resource of the agent 500.

Upon determining that the soft limit of a particular resource is breached (e.g., exceeded), the process 600 proceeds to the operation 620. Specifically, the process 600 proceeds to the operation 620 when the agent policing system 520 determines that a resource limit of a particular resource exceeds the soft limit but is less than the hard limit. If the soft limit is not breached, the agent policing system 520 continues to monitor the soft and hard limits at the operation 615. Likewise, the process 600 proceeds to the operation 625 when the agent policing system 520 determines that a resource limit of a particular resource exceeds the hard limit or continues to monitor the soft and hard limits at the operation 615 if no hard limits are breached.

At operation 630, which is reached when the soft limit is breached at the operation 620, the agent policing system 520 troubleshoots the agent 500. The agent policing system 520 automatically troubleshoots the agent 500 upon detecting a breach of the soft limit without waiting for an input from the telemetry control system 305. The troubleshooting actions taken depend upon the type of resource whose soft limit has been breached. For example, if the resource whose soft limit is breached is memory, the agent policing system 520 may perform troubleshooting actions that are specifically designed to reduce memory usage. Example troubleshooting actions may include cleaning and freeing up of any unused memory space in the memory 515 of the agent 500, including other memory devices associated with the agent. The agent policing system 520 may also trim (e.g., remove a percentage of entries) from any cache memory (which may also be part of the memory 515) associated with the agent 500. The agent policing system 520 may perform any other designated actions that are specific to the resource being troubleshot to bring the utilization of that resource within the soft limit.

The specific actions to perform during troubleshooting for each resource of the agent 500 may be pre-programmed within the agent policing system 520. For example, such actions may be part of the configuration file 510, stored separately in the memory 515, or otherwise made accessible to the agent policing system. Upon performing the troubleshooting actions, the agent policing system 520 returns to the operation 615 to continue monitoring for breaches in the soft and hard limits of that resource (along with other resources). In some embodiments, the agent policing system 520 may perform a specific check on the utilization of the resource after completion of the troubleshooting actions at the operation 620 to ensure that the utilization of the resource is within the soft limit. In other embodiments, the agent policing system 520 may simply assume that by virtue of performing the troubleshooting actions at the operation 620, the utilization of that resource is within the soft limit.

Further, in some embodiments, if the agent policing system 520 determines (e.g., at the operation 615 after performing the troubleshooting actions at the operation 620 or during a specific check after the operation 620) that the utilization of the resource continues to breach the soft limit, the agent policing system may perform additional troubleshooting actions and/or wait for the resource to breach the hard limit. Upon breaching the hard limit, the process 600 proceeds to the operation 625.

In some embodiments, the agent policing system 520 may also create a record of the soft limit breach and/or troubleshooting actions performed. For example, in some embodiments, the agent policing system 520 may record (e.g., in a log) the identity of the resource whose soft limit was breached, data about the breach itself (e.g., time when the breach occurred, the values of the resource utilization when the breach occurred, etc.), the troubleshooting processes employed, and any other information considered necessary or desirable. Such a record may provide insights into a pattern of problems with the agent or in a particular resource of the agent. In some embodiments, the agent policing system 520 may also transmit the record to the telemetry control system 305 and/or make the record available to the telemetry control system when needed.

Referring still to FIG. 6, if the agent policing system 520 determines at the operation 625 that the hard limit of a particular resource has been breached, at operation 635, the agent policing system performs one or more troubleshooting actions. The operation 635 is same as the operation 630. Thus, the troubleshooting actions taken at the operation 635 are same as the troubleshooting actions taken at the operation 630. Therefore for example, if the resource whose hard limit is breached is memory, the agent policing system 520 may clean up and free any unused memory space, as well as trim the cache memory. The agent policing system 520 may perform any other actions that may be programmed within the agent policing system to perform as a troubleshooting action.

Upon completing the troubleshooting actions at the operation 635, at operation 640, the agent policing system 520 determines whether the utilization of the resource is less than the hard limit. If the agent policing system 520 determines that the utilization is less than the hard limit (even if greater than the soft limit), the agent policing system returns to the operation 615 for monitoring the soft and hard limits of that resource. If the agent policing system 520 determines that the utilization exceeds the hard limit even after the troubleshooting actions of the operation 635, the agent policing system terminates the agent 500 at operation 645. Thus, the agent self-terminates. To terminate the agent 500, the agent policing system 520 may at least temporarily halt operation of the agent 500. The agent policing system 520 may perform any other action that may be needed or considered desirable to put the agent in an inoperative state at least temporarily.

In addition to terminating the agent 500, the agent policing system 520 may create a record of the agent self-termination, including a record of the cause of the termination. The agent policing system 520 may store the record within the configuration file 510, the memory 515, or any other storage device/file designated for such records. The agent policing system 520 may also record various usage characteristics of the resource and other operating parameters at the time of breach of hard limits. Upon terminating the agent 500 at the operation 645, the process 600 ends at operation 650.

Thus, the agent 500 is configured to self-police its operation and quarantine itself in the event of conditions that may impact the reliability of the telemetry system (e.g., the telemetry system 300 in FIG. 3) or the operation of other agents in the telemetry system.

Figure 7:
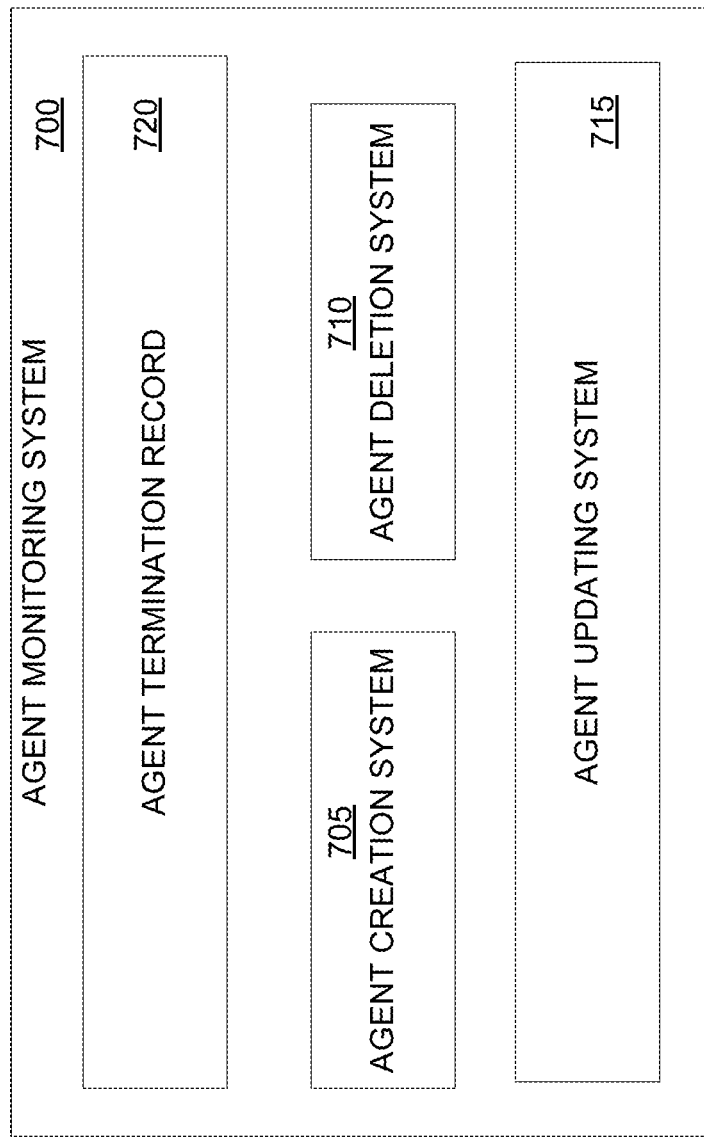
FIG. 7 is an example block diagram of an agent monitoring system of the telemetry system of FIG. 3, in accordance with some embodiments of the present disclosure.

In addition to the agent 500 self-policing, the agent monitoring system 350 of the telemetry control system 305 of the telemetry system 300 of FIG. 3 also monitors and manages the agent 500. An example block diagram of an agent monitoring system 700 is shown in FIG. 7, in accordance with some embodiments of the present disclosure. The agent monitoring system 700 is analogous to the agent monitoring system 350 of FIG. 3. The agent monitoring system 700 is configured to monitor and manage the agents (e.g., the agent 500). Thus, the agent monitoring system 700 includes an agent creation system 705, an agent deletion system 710, and agent updating system 715, as well as an agent termination record 720. Although the agent creation system 705, the agent deletion system 710, the agent updating system 715, and the agent termination record 720 are shown as separate components, one or more of those components may be combined together. Likewise, although only the agent creation system 705, the agent deletion system 710, the agent updating system 715, and the agent termination record 720 are shown in the agent monitoring system 700, in other embodiments, additional or different components may be provided within the agent monitoring system to perform the functions described herein.

The agent creation system 705 of the agent monitoring system 700 may be used to create (also referred to herein as "deploy") new agents (e.g., the agent 500) within the telemetry system (e.g., the telemetry system 300 of FIG. 3). To create or deploy new agents, the agent monitoring system 700 may install an instance of the agent on or within a component of the data source to be monitored. In some embodiments, the agent monitoring system 700 may deploy the agent remote from the data source to be monitored. The agent monitoring system 700 may also create an instance of a configuration file for the agent and configure that agent in accordance with the parameters and settings indicated in the configuration file. As indicated above, the agent monitoring system 700 receives instructions from the management system (e.g., the management system 325 of FIG. 3). A user via the management system may provide the various parameters and settings for the configuration file of the agent, and the agent monitoring system 700 may then configure the agent in accordance with those parameters and settings.

The agent deletion system 710 of the agent monitoring system 700 is configured to delete one or more existing agents from the telemetry system 300. To delete an agent, the agent deletion system 710 may uninstall the instance of the agent to be deleted, as well as delete the configuration file of that agent. The agent deletion system 710 may take any other action considered desirable to ensure that the agent is permanently inoperative. An agent may be deleted if that agent is no longer needed or is malfunctioning and beyond repair. Again, the agent deletion system 710 may receive instructions from the management system 325 to delete an agent, and the agent deletion system may delete the agent in response to those instructions.

Further, as indicated above, each agent (e.g., the agent 500) may have a priority associated therewith. One of the agents may be designated a leader (and have a higher priority) and other agents may be designated as followers (and have a lower priority). If the agent deletion system 710 decides to (e.g., receives instructions from the management system 325) to delete multiple agents, agents with lower priority may be deleted first. If the leader agent is deleted, another leader agent may be designated.

The agent updating system 715 of the agent monitoring system 700 is configured to update existing agents (e.g., the agent 500). For example, the agent updating system 715 may continuously (or periodically) monitor each agent that is deployed and manage the operation of those agents. For example, as discussed above, each agent self-polices and may terminate itself if the hard limits are continually exceeded. Upon detecting that a particular agent has terminated itself, the agent updating system 715 may attempt to periodically restart the agent. The agent updating system 715 may also determine the termination cause, and/or update the configuration file of that agent. The monitoring and managing of the agents by the agent updating system 715 is described further in FIG. 8.

The agent termination record 720 is a log, file, or database of a pre-determined number of past termination causes of each agent. Thus, for each agent, the agent monitoring system 700 creates and maintains a record of the causes of termination of that agent. Upon self-terminating, each agent emits an exit code identifying the cause of termination, which is recorded within the configuration file 510 or in another record of the agent. The agent monitoring system 700 may retrieve that exit code (or the agent may automatically transmit the exit code to the agent monitoring system) and save that exit code in the agent termination record 720. The agent termination record 720 may also save additional information pertaining to agent terminations. For example, in some embodiments, the agent termination record 720 may record the dates/times at which the agents terminate, the identity of the agent that terminated, and any other information that is needed or considered desirable.

Turning now to FIG. 8, an example flowchart outlining operations of a process 800 is shown, in accordance with some embodiments of the present disclosure. The process 800 may include additional, fewer, or different operations, depending on the particular embodiment. The process 800 is discussed in conjunction with FIGS. 3, 6, and 7 and is implemented by the agent monitoring system 700 and particularly by the agent updating system 715 of the agent monitoring system to monitor an agent (e.g., the agent 500). Upon starting at operation 805, at operation 810, the agent updating system 715 continues to monitor each of the agents that are associated with the agent monitoring system 700. At operation 815, the agent updating system 715 determines that one or more of the agents that the agent updating system monitors has self-terminated. As indicated above, in some embodiments, the terminating agent(s) may notify the agent updating system 715 of the termination, while in other embodiments, the agent updating system may determine by itself that the agent(s) has(ve) terminated based upon the monitoring actions of the operation 810.

Upon determining the self-termination of one or more agents, at operation 820, the agent updating system 715 determines a cause of termination of those agents from the exit code and/or any other information that the agent updating system may have available thereto. The agent updating system 715 updates the agent termination record 720 of the terminated agent(s) at operation 825 to include the exit code and any other information associated with the termination. At operation 830, for each terminated agent, the agent updating system 715 determines whether a number of times that the agent has terminated within a predetermined time period is greater than a predetermined threshold. The number of times that a particular agent self-terminated may also be recorded within the agent termination record 720. Thus, the agent updating system 715 may determine from the agent termination record 720 how many times a particular agent has terminated in the past within the predetermined time period, and compare that number with the predetermined threshold.

In some embodiments, the agent updating system 715 may have a separate predetermined threshold for each termination cause of the agent. For example, the agent updating system 715 may have a first predetermined threshold for memory related self-termination, a second predetermined threshold for CPU related self-termination, and so on. In other embodiments, a single predetermined threshold may be used. When separate predetermined thresholds are used, the agent updating system 715 may compare the number of times that the agent has self-terminated to the separate predetermined thresholds. For example, for memory related self-termination causes, the agent updating system 715 may compare the first predetermined threshold above to the number of times the agent has self-terminated due to memory related causes. When a single predetermined threshold is used, the agent updating system 715 may compare the aggregate of the number of times the agent has self-terminated regardless of the termination cause with the predetermined threshold.

The number of times that a particular agent has terminated in the past and comparison of that number with the predetermined threshold at the operation 830 may be indicative of whether a particular problem causing the agent to self-terminate is temporary or recurring/perennial. For example, if the number of times that a particular agent has self-terminated in the past within the predetermined time period is less than the predetermined threshold, the agent updating system 715 may determine that the problem is temporary and attempt to restart the agent at operation 835. The agent updating system 715 may restart the agent at the operation 835 after a first predetermined delay. As discussed above, in some embodiments, a problem may be an incidental problem caused by other components or problems within the telemetry system. In such cases, restarting the agent after the first predetermined delay may allow enough time for the problem to resolve, and allow the agent to resume normal operation.

Like the predetermined threshold of the operation 830, the first predetermined delay may be specific to the termination cause of the agent or a single first predetermined delay may be used regardless of the termination cause. Upon restarting the agent at the operation 835, the agent updating system 715 returns to the operation 810 to continue monitoring the agent.

On the other hand, if at the operation 830, the agent updating system 715 determines that the number of times the agent has self-terminated is greater than the predetermined threshold, the agent updating system still attempts to restart the terminated agent at operation 840, but after a second predetermined delay that is longer than the first predetermined delay of the operation 835. By virtue of exceeding the predetermined threshold at the operation 830, the agent updating system 715 may determine that the cause of self-terminating is likely not incidental (e.g., or is incidental but needs a longer time to recover). Therefore, the agent updating system 715 attempts to restart the agent at the operation 840 after a longer delay. Upon restarting the agent at the operation 840, the agent updating system 715 determines again, at operation 845, whether the agent is still self-terminating. If the agent has not self-terminated upon restarting at the operation 840 for a predetermined period of time, the agent updating system 715 returns to the operation 810 to continue monitoring the agent. If the agent self-terminates again after restarting at the operation 840 within the predetermined period of time, the agent updating system updates at least the hard limits of the resource causing the termination needs to be updated in the configuration file 510 at operation 850.

To update the configuration file 510, the agent updating system 715 reviews the agent termination record 720 of the agent 500 whose configuration file needs to be updated. By reviewing the agent termination record 720, the agent updating system 715 may determine whether the cause of termination of the agent 500 in the past (e.g., within a predetermined past time period) has been due to exceeding the hard limit of the resource that caused the termination at the operation 845. For example, the agent updating system 715 may determine from the agent termination record 720 of the agent 500 that the agent has terminated in the past due to the same cause for which the agent terminated at the operation 845 (and/or at the operation 815) greater than a predetermined number of times in a given past time period. If so, the agent updating system 715 may determine that the hard limit of the resource causing repeated terminations needs to be updated.

To determine the updated hard limit of that resource, the agent updating system 715 may retrieve actual usage statistics of that resource from the agent 500. The agent updating system 715 may determine that the usage of that resource by the agent 500 is typically greater than the hard limit. For example, if the agent updating system 715 determines that the usage of that resource by the agent 500 in a given time period has been greater than the hard limit currently set for that resource for a predetermined number of times, the agent updating system may determine that the agent typically requires a greater allocation of that resource than currently allowed by the hard limit. In such cases, the agent updating system 715 may update the hard limit of that resource within the configuration file 510 of the agent 500 with the value that the agent typically uses. Thus, the agent updating system 715 may update the configuration file 510 of the agent 500 based upon the agent termination record 720 reflecting past termination causes, as well as actual usage statistics of that agent for a particular resource.

In some embodiments, and particularly when the agent 500 does not have a past history of terminating for the cause for which the agent terminated at the operation 845 (or at operation 815), the agent updating system 715 may review the usage statistics of other related agents to determine the usage patterns of that resource. For example, if the agent 500 terminated at the operation 845 (and/or at the operation 815) due to memory related issues fewer than a predetermined number of times, the agent updating system 715 may determine that the agent does not have a recurrent history of memory related terminations. In such cases, in addition to reviewing the actual usage statistics of memory of the agent 500, the agent updating system 715 may also review memory related usage statistics of other agents in the telemetry system. If the actual memory related statistics of the agent 500 are less than the actual memory related statistics of the other agents, and if the actual memory related statistics of the other agents is greater than the hard limit of the agent 500, the agent updating system 715 may update the hard limit of memory for the agent 500 based on the actual usage value from the other agents. Thus, the agent updating system 715 may review operation characteristics of related agents to update the configuration file 510 of the agent 500.

In yet other embodiments, the agent updating system 715 may simply receive instructions from the management system 325 to update the configuration file 510 with specific hard limit values, and the agent updating system may update the configuration file in accordance with those instructions. Thus, the agent updating system 715 may use a variety of techniques mentioned above, either alone or in combination, to update the configuration file 510 of the agent 500. The agent updating system 715 may use additional or other techniques as well in other embodiments to update the configuration file 510.

Further, to update the configuration file 510 of the agent 500, the agent updating system 715 may pause operation of the agent, retrieve the configuration file, update the configuration file, and resume agent operation. In other embodiments, the agent updating system 715 may be able to update the configuration file 510 of the agent 500 in background, without having to disrupt then normal operation of the agent.

Additionally, although the updating of the configuration file 510 of the agent 500 has been discussed above with respect to updating hard limits, in other embodiments, the soft limit and/or the general allocated amount of that resource may be updated. Further, although the updating above has been discussed with respect to updating the limits of the resource that caused the termination of the agent 500 at the operation 845 (and/or at the operation 815), in some embodiments, the agent updating system 715 may determine (e.g., from the agent termination record 720, the actual usage statistics, etc.) that the agent has a repeated termination history of terminating due to another cause, and the agent updating system may update the limits of that another cause.

Upon updating the configuration file 510 of the agent 500 at the operation 850, the agent updating system 715 restarts the agent at operation 855 and returns to the operation 810 to continue monitoring that agent along with other agents.

Thus, the present disclosure provides a mechanism to effectively, efficiently, and reliably collect telemetry data, and transmit the telemetry data to one or more destinations. The present disclosure also provides an effective mechanism to manage the agents, identify potential problems with the agents, and proactively address those problems before escalation.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    determining, by a telemetry system, that an agent terminated during operation, wherein the agent collects telemetry data from a data source;
    determining, by the telemetry system, that a number of times the agent has terminated is greater than a predetermined threshold;
    restarting, by the telemetry system, the agent after a first predetermined delay in response to exceeding the predetermined threshold;
    determining, by the telemetry system, that the agent terminated again within a predetermined time period upon restarting;
    updating, by the telemetry system, a configuration file of the agent in response to the termination within the predetermined time period; and
    restarting, by the telemetry system, the agent with the updated configuration file.

2. The method of claim 1, wherein the updating of the configuration file is based upon an exit code received from the agent upon termination within the predetermined time period.

3. The method of claim 1, wherein the updating comprises updating a hard limit of utilization of a resource of the agent in the configuration file.

4. The method of claim 1, wherein the updating is based upon an actual usage statistic of a resource of a related agent, wherein the related agent uses the telemetry system used by the agent.

5. The method of claim 1, wherein the updating is based upon an actual usage statistic of a resource of the agent.

6. The method of claim 1, further comprising:
    deploying, by the telemetry system, the agent to collect the telemetry data from the data source; and
    monitoring, by the telemetry system, an operating status of the agent upon deployment.

7. The method of claim 1, further comprising assigning, by the telemetry system, a priority to the agent upon deployment.

8. The method of claim 1, further comprising:
    receiving, by the telemetry system, the telemetry data from the agent; and
    updating, by the telemetry system, a commit log with the telemetry data.

9. The method of claim 1, further comprising transmitting, by the telemetry system, a portion of the telemetry data received from the agent to an end point.

10. The method of claim 9, further comprising
    deleting, by the telemetry system, the portion of the telemetry data from a commit log upon receiving an indication of successful delivery from the end point.

11. The method of claim 9, wherein the portion of the telemetry data that is transmitted is saved into a commit log before transmitting.

12. An apparatus comprising:
    a telemetry controller that manages an agent collecting telemetry data from a data source, wherein the telemetry controller comprises a processing unit having programmed instructions to:
        determine that the agent terminated during operation;
        determine that a number of times the agent terminated is greater than a predetermined threshold;
        restart the agent after a first predetermined delay in response to exceeding the predetermined threshold;
        determine that the agent terminated again within a predetermined time period upon restarting;
        update a configuration file of the agent in response to the termination within the predetermined time period; and
        restart the agent with the updated configuration file.

13. The apparatus of claim 12, wherein the telemetry controller updates the configuration file based upon at least one of an actual usage statistic of a resource of the agent, the actual usage statistic of the resource of a related agent, wherein the related agent uses the telemetry system used by the agent, or an exit code received from the agent upon termination within the predetermined time period.

14. The apparatus of claim 12, wherein the agent self-polices its operation based upon a hard limit and a soft limit of utilization of a resource allocated to the agent.

15. The apparatus of claim 14, wherein upon exceeding the soft limit or the hard limit, the agent troubleshoots itself.

16. The apparatus of claim 14, wherein the agent self-terminates upon exceeding the hard limit.

17. The apparatus of claim 12, wherein the agent transmits an exit code upon termination to the telemetry controller.

18. The apparatus of claim 12, wherein the telemetry controller manages the agent in response to an instruction received from a management system.

19. A non-transitory computer readable media with computer-executable instructions embodied thereon that, when executed by a processor of a telemetry system, cause the telemetry system to perform a process comprising:
    determining that an agent terminated during operation, wherein the agent collects telemetry data from a data source;
    determining that a number of times the agent has terminated is greater than a predetermined threshold;
    restarting the agent after a first predetermined delay in response to exceeding the predetermined threshold;
    determining that the agent terminated again within a predetermined time period upon restarting;
    updating a configuration file of the agent in response to the termination within the predetermined time period; and
    restarting the agent with the updated configuration file.

20. The non-transitory computer readable media of claim 19, wherein the processor transmits the telemetry data received from the agent to an end point.

21. The non-transitory computer readable media of claim 19, wherein the process further comprises storing the telemetry data received from the agent in a memory before transmission of the telemetry data to an end point.

22. The non-transitory computer readable media of claim 21, wherein a portion of the telemetry data is transmitted from the memory at a time.

23. The non-transitory computer readable media of claim 21, wherein the telemetry data that is successfully transmitted is deleted from the memory.

24. The non-transitory computer readable media of claim 21, wherein the telemetry data is transmitted from the memory in the order in which the telemetry data is received from the agent.

* * * * *